US007034916B2

(12) United States Patent
Bubie et al.

(10) Patent No.: US 7,034,916 B2
(45) Date of Patent: *Apr. 25, 2006

(54) SCHEDULING BETWEEN DIGITAL PROJECTION AND FILM PROJECTION CORRESPONDING TO A PREDETERMINED CONDITION

(75) Inventors: Walter C. Bubie, Rochester, NY (US); Curtis R. Cates, Rochester, NY (US); David S. Jones, Fairport, NY (US); Paul Tomblin, Rochester, NY (US); Michael E. McCrackan, Rochester, NY (US); William A. Orfitelli, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/979,371

(22) Filed: Nov. 1, 2004

(65) Prior Publication Data

US 2005/0062935 A1 Mar. 24, 2005

Related U.S. Application Data

(63) Continuation of application No. 10/309,867, filed on Dec. 4, 2002, now Pat. No. 6,812,994.

(51) Int. Cl.
*G03B 21/32* (2006.01)
*H04N 7/18* (2006.01)
*H04N 7/173* (2006.01)

(52) U.S. Cl. .............................. 352/40; 725/74; 725/86; 725/116

(58) Field of Classification Search ................. 352/40, 352/123; 725/74, 78, 86, 93, 116
See application file for complete search history.

(56) References Cited

U.S. PATENT DOCUMENTS

| 5,420,978 A | 5/1995 | Tozawa et al. ............. 395/161 |
| 6,384,893 B1 | 5/2002 | Mercs et al. ................. 352/133 |
| 6,812,994 B1 * | 11/2004 | Bubie et al. ................... 352/40 |

(Continued)

FOREIGN PATENT DOCUMENTS

EP 0 306 965 A2 9/1988 ................. 15/60

(Continued)

OTHER PUBLICATIONS

"Making Digital Cinema Actually Happen—What it Takes and Who's Going to Do It" by Steven A. Morley. SMPTE 140th Technical Conference, Pasadena, California, Oct. 31, 1998.

*Primary Examiner*—Rodney Fuller
(74) *Attorney, Agent, or Firm*—Stephen H. Shaw

(57) ABSTRACT

A method is described for scheduling a playlist from digital content supplied to a server in a multi-screen digital cinema theater. The playlist includes digital content stored in the server and that is subsequently projected in the digital cinema theater. The method includes: (a) generating and displaying a table of playlists currently available for scheduling; (b) generating and displaying a schedule table showing a schedule view for each screen as an elongated timeline bar representing a time dimension. The method further includes: (c) selecting a playlist from the table of playlists and specifying a scheduled start time and a selected screen; and (d) updating the schedule table by inserting the selected playlist as an elongated element into the elongated timeline bar for the selected screen, whereby the updated schedule table is used to schedule the selected playlist for the selected screen.

7 Claims, 12 Drawing Sheets

U.S. PATENT DOCUMENTS

| | | | |
|---|---|---|---|
| 2002/0056081 A1 | 5/2002 | Morley et al. | 725/1 |
| 2002/0069107 A1 | 6/2002 | Werner | 705/14 |
| 2002/0122155 A1 | 9/2002 | Morley et al. | 352/40 |
| 2003/0048418 A1 | 3/2003 | Hose et al. | 352/123 |

FOREIGN PATENT DOCUMENTS

| | | | |
|---|---|---|---|
| EP | 1 103 845 A1 | 5/2001 | 21/12 |
| WO | WO 01/13301 A2 | 2/2001 | |

* cited by examiner

Schedule Time Blocks

Schedule a Time Block for:
<day>, <date>

Film Title/ Block Description:

*The description will appear in the Schedules view.*

Film Booking Number (optional):

Start time: <hh> : <mm>  ○AM  ●PM

Run time: <minutes> minutes

Screen: * Select a screen *

Close

Schedule Rolling Ads

Schedule playlist: *<playlist name>*

Repeat schedule for: [*<value>*] days, beginning on
*<current schedule date>*

Add schedule to selected screens.

- [x] 1. Main aud/m (Digital)
- [ ] 2. Auditorium 1 (Closed)
- [ ] 3. Auditorium 2 (Digital)
- [ ] 4. Auditorium 3 (Film)
- [ ] 5. Auditorium 4 (Film)
- [ ] 6. Lobby display - front
- [ ] 7. Lobby display - back

[Select All] [Clear Selections]

[Schedule] [Cancel]

SCHEDULING BETWEEN DIGITAL PROJECTION AND FILM PROJECTION CORRESPONDING TO A PREDETERMINED CONDITION

CROSS-REFERENCE TO REALTED APPLICATION(S)

This is a continuation of U.S. application Ser. No. 10/309,867, filed Dec. 4, 2002 now U.S. Pat. No. 6,812,994 by Bubie et al., and entitled "Streamlined Methods and Systems for Scheduling and Handling Digital Cinema Content in a Multi-Theatre Environment", wherein this prior application is incorporated by reference herein.

FIELD OF THE INVENTION

This invention is related to the field of digital cinema, and more particularly to the preparation, scheduling and use of digitized motion picture information in a multi-theater environment.

BACKGROUND OF THE INVENTION

Today, motion pictures—from feature films, to film based commercials—are distributed and exhibited largely in the form of film. Studios produce film masters, and distributors produce film copies that are then distributed to theatres for exhibition. In the theatre, especially multi-screen 'cineplexes', incoming films need to be scheduled for exhibition. Specifically, the theatre home office and the theatre manager determine the auditorium and show times for a particular film. A schedule is compiled, usually describing the theatre exhibition plan for 1–2 weeks, or until a new feature is acquired. Executing a schedule typically entails moving huge rolls of film from one projector station to another station; preparing the new feature showing by splicing separate reels of film together, adding film trailers and 'rolling advertisements' to the beginning. Overall, it is a labor-intensive process.

There have been attempts in the prior art to automate the control of movie display electronics in a film cinema system. For instance, in U.S. Pat. No. 6,384,893 B1, which is entitled "Cinema Networking System" and was issued May 7, 2002, such a system includes a cinema controller which receives as input, information regarding start times of movies and content of corresponding film reels. The information can be input a variety of ways. In one embodiment, the information is manually entered into a file or database for subsequent reference. The publication shows (FIG. 4) an entry form that may be displayed. In this embodiment, an operator enters, either via a keyboard and/or by using a cursor control device, a description of the content of the film reels including the duration and film format of each segment. In addition, a film identifier, such as the title, is supplied along with the times it is to be played in a particular projection room. Other embodiments are also contemplated. For example, the information may be received or downloaded from a remote centralized location. Alternately, the information may be retrievable from a web site maintained to contain such information.

Over the last few years, the digitization of film has become very common for the purpose of integrating computer-generated special effects in scene content. Digitized content turns out to be much easier to handle, from the point of view of making copies, storing, distributing, and 'touching up'. A natural outgrowth of digital special effects work is the attempt to carry the digitized content through post-production, onto distribution and exhibition. Such a workflow is described in general as 'digital cinema'. Recent technological advances in storage, networking and projection equipment are making digital cinema a genuine possibility.

As described by S. A. Morley, in "Making Digital Cinema Actually Happen—What it Takes and Who's Going to Do It", SMPTE 140$^{th}$ Technical Conference, Pasadena, Calif., Oct. 31, 1998, digital cinema provides an ability to extend presentation capabilities beyond just showing movies. More specifically, a simple graphical computer interface can make screen scheduling easy, accurate and flexible for the theatre operator. Although no specific interface is described, Morley opines that by a simple drag-and-drop action on a PC in a theater manager's office, a movie can be scheduled to show at a certain time in a given auditorium and with a defined set of trailers and promotions, which can be changed at each show time.

Avica Technology Corp. markets a Digital Cinema Manager product that allows monitoring and control of storage server parameters by a theatre manager or engineering supervisor in a digital cinema environment. Security setting, playlist creation, content load-in and system maintenance functions can be accessed from local or network connections. Multiple servers can be monitored and controlled from a single terminal. Conversely, multiple management terminals may access an individual server. The user interface provides creation of multi-event playlists including features, trailers and promotions, and timeline based playlist management for a single auditorium at a time.

Whether automating the scheduling of film cinema or digital cinema systems, the prior art has come up short in providing a user-friendly interface, particularly in a multi-screen cineplex environment. What is therefore needed is an approach that leverages the flexibility provided by digital cinema without adding unnecessary complexity in the scheduling task.

SUMMARY OF THE INVENTION

The present invention is directed to overcoming one or more of the problems set forth above. Briefly summarized, according to one aspect of the present invention, a method is described for scheduling a playlist from digital content supplied to a server in a multi-screen digital cinema theater, where the playlist includes components of the content stored in the server and represents a digital entity that is subsequently projected in the digital cinema theater. The method includes the steps of: (a) generating and displaying a table of playlists currently available for scheduling, each playlist displayed along with its run time; (b) generating and displaying a schedule table showing a schedule view for each screen as an elongated timeline bar representing a time dimension, wherein the elongated timeline bars for a plurality of the screens are arranged one adjacent the other relative to a displayed time axis to provide an overall perspective of the schedules for the screens of the theater; (c) selecting a playlist from the table of playlists and specifying a scheduled start time and a selected screen; and (d) updating the schedule table by inserting the selected playlist as an elongated element into the elongated timeline bar for the selected screen, wherein the element starts at the scheduled start time and has a time dimension corresponding to the run time of the selected playlist, whereby the updated schedule table is used to schedule the selected playlist for the selected screen.

In a further aspect of the invention, a digital cinema system is described for exhibiting digital content supplied in a coded form to a central content management server in a multi-screen digital cinema theatre having a plurality of auditoriums. The digital cinema system includes: a plurality of digital projectors for projecting digital content in the plurality of auditoriums, each projector including a decoder for decoding the digital content into a device-dependent signal for projection; a plurality of content player servers, each one devoted to a respective digital projector; and a local area network linking the content player servers to the central content management server and to the digital projectors, whereby each digital projector is a network-enabled device that can communicate with any of the content player servers to display digital content. In still a further aspect, the digital cinema system includes a cinema operating system for generating and scheduling playlists, each playlist including components of the content stored in the content management server and representing a digital entity that is subsequently projected in the digital cinema.

By counting the creating of playlists as a precursor to scheduling, there is the advantage that the need to physically handle, splice and set up large lengths of film is obviated.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 6 is a pictorial illustration of a dialog box for scheduling a time block in a schedule timeline shown in the scheduling context screen shown in FIG. 2, which is accessible through the scheduling context screen shown in FIG. 2 and the menu controls shown in FIG. 3.

FIG. 7 is a pictorial illustration of a dialog box for scheduling a playlist in the background of a schedule timeline shown in the scheduling context screen shown in FIG. 2, which is accessible through the scheduling context screen shown in FIG. 2 and the menu controls shown in FIG. 3.

FIG. 8 is a pictorial illustration of a dialog box for scheduling a rolling ad in a schedule timeline shown in the scheduling context screen shown in FIG. 2, which is accessible through the scheduling context screen shown in FIG. 2 and the menu controls shown in FIG. 3.

DETAILED DESCRIPTION OF THE INVENTION

Figure 1:
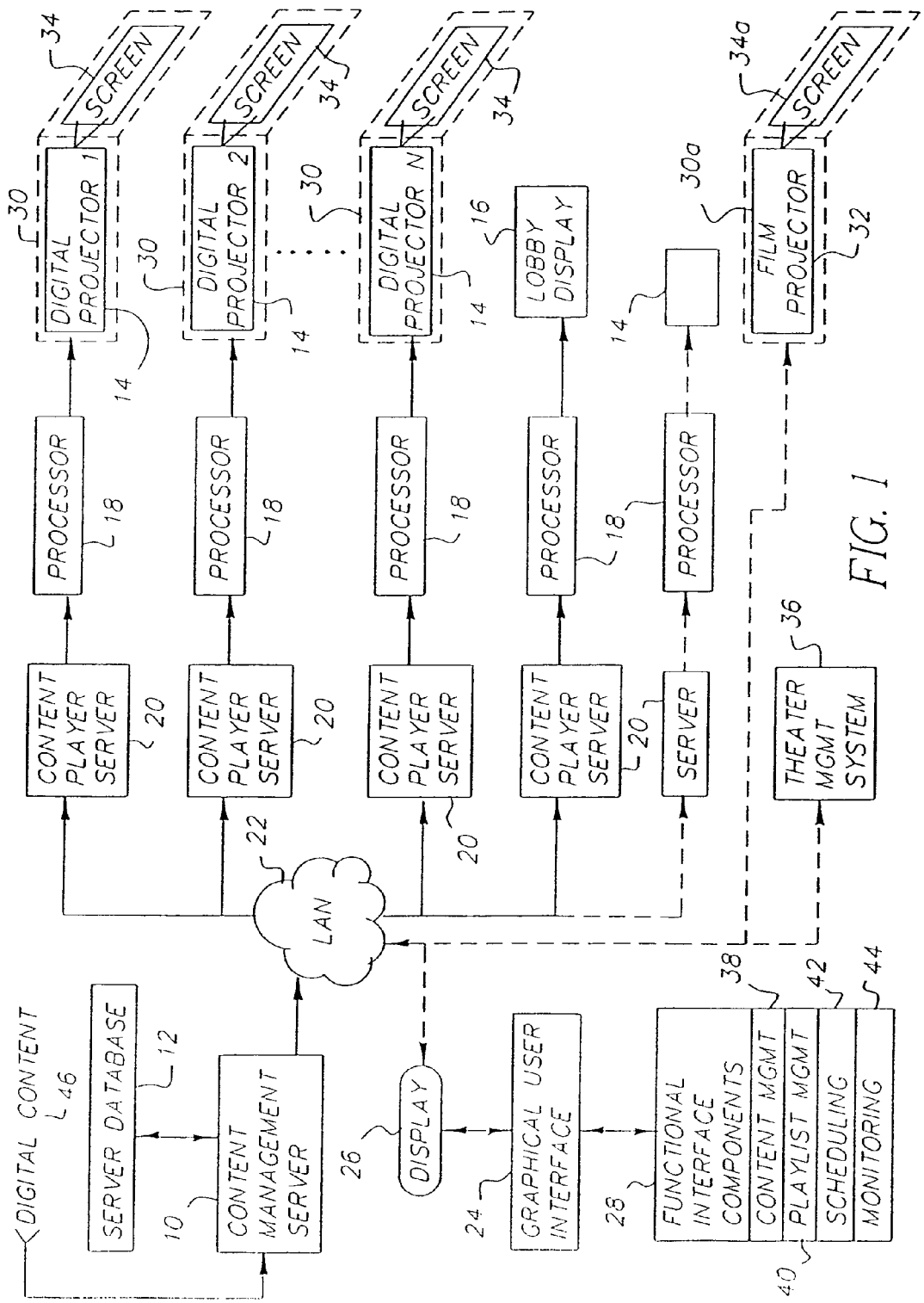
FIG. 1 is a block diagram of an exhibition component of a digital cinema system, showing in particular a cinema operating system in accordance with the invention.

Because digital image processing systems are well known, the present description will be directed in particular to attributes forming part of, or cooperating more directly with, a method and system in accordance with the present invention. Method and system attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the method and system as described according to the invention in the following materials, software not specifically shown, suggested or described herein that is useful for implementation of the invention is conventional and within the ordinary skill in such arts. If the invention is implemented as a computer program, the program may be stored in a conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

A digital cinema system comprises a digital mastering center for generating digital content, such as from a feature film, a distribution center for transmitting the digital content, and a digital exhibition center for projecting the content to audiences. The exhibition center will include, among its many parts, a projection system and a software application herein identified as the digital cinema operating system. The digital cinema operating system is a custom software solution that supports the loading, scheduling, control and playback of features, trailers and other pre-show content, such as slide shows and advertising, on multiple digital cinema screens. While not a specific part of this description, the digital cinema operating system will download decryption keys from studios to allow features to be played back on digital projectors, and also controls automated theatre operation such as lighting and sound systems. In the latter connection, the digital cinema operating system will typically interface with existing, commercially-available control systems for such automated theatre operations.

Besides referring to the digital distribution and projection of first-run movies, digital cinema has also been used to refer to the digital distribution and projection of pre-show entertainment, including commercials, music videos and other content, ordinarily in connection with the showing of full-length feature motion picture films, perhaps with film trailers and the like. Thus, and as used herein in a preferred embodiment, the digital cinema operating system refers to an in-theater network to receive, schedule, distribute and project advertising and other pre-show content as a digital entity preceding and/or following a motion picture film feature, as well as to an in-theater network to receive, schedule, distribute and project full-length feature digital content, often with digital trailers, advertising and other pre-show, or inter-show content, where all of the digital entities are combined together as a single digital presentation. Furthermore, in another embodiment, as will be illustrated in FIG. 12, the scheduling functionality of the digital cinema operating system may be shared with other components of the digital cinema system, such as a central digital cinema distribution facility or service, where it may be convenient to establish an association between certain digital content, such as between certain ad or trailer content and specific feature content.

The digital cinema system is comprised of hardware and software (the digital cinema operating system) that, when installed in a multi-screen cineplex, can provide sophisticated digital cinema functionality. Referring to FIG. 1, the digital cinema system is comprised of:

a high storage capacity content management server 10 having a server database 12 associated therewith;

one or more high resolution digital projectors 14 and/or high resolution display screens 16, each projector and/or screen connected to, one or more specialized decoding processors 18 for decoding compressed digital content that is downloaded from the content management server 10 to one or more content player servers 20, each content player server 20 connected to, a local area network (LAN) 22 tying each of the content player servers 20 to the content management server 10; and a cinema operating system graphical user interface 24 used to manage digital cinema content, schedule content, and in general control the various components of the system, wherein the user interface 24 interfaces with a high resolution display 26 to implement the functional interface components 28 of the cinema operating system.

As shown in FIG. 1, the cinema operating system operates in a multi-screen cineplex environment featuring both digital and film content shown in a plurality of auditoriums 30, each having a screen 34 that is positioned to receive a projected image. More specifically, the digital projectors 14 are used in one or more auditoriums 30 (three being shown) to project a digitally-obtained image upon the screens 34 and a film projector 32 is used in at least one of the auditoriums 30a to project a film image upon a screen 34a. In regard to film projection, the cinema operating system may signal a projectionist at an appropriate time to begin projection. Alternatively, actual control of the film projector may be integrated into the cinema operating system through the user interface 24. Moreover, since digital content (such as ad content) may be played before and/or after a motion picture film, the film auditorium 30a may also contain a digital projector 14 connected as shown in broken line to the LAN 22 through a content player server 20 and a processor 18. A theatre management system 36 may also be integrated into the cinema operating system through the user interface 24, and it provides automated control of lighting and sound systems, as well as integrating with a ticket sales and advertising system.

The illustrated LAN connection 22 may be implemented with any suitable network architecture, such as Ethernet. In practice, the processors 18 (which in one embodiment may be a processor board/card added to the content player servers 20 instead of a separate component (18) as shown in FIG. 1) decode the image data into a device-dependent signal, such as RGB, suitable for driving the projectors 14. This means that the connection between the processors 18 and the projectors 14 is a dedicated off-network connection. If the decoder processor (18) is instead embedded into the projectors 14, then the projectors 14 will become network devices capable of being driven directly off the LAN 22. As will be explained further in connection with FIG. 12, having the projectors 14 as network devices has an added redundancy benefit since any given projector can be driven off any content server 20, therefore providing automatic backup in case the content server for a particular auditorium should go down.

The user interface 24 of the cinema operating system is designed to be operated by a theatre manager and/or a lead projectionist or other designated person, usually in the environment of their offices or workspaces, such as a projection booth or for that matter any place connectable to the LAN 22. At the core of the cinema operating system are the functional interface components 28, which in this embodiment include four functional components:

a content management function 38;

a playlist management function 40;

a scheduling function 42; and an exhibition/playback monitoring function 44.

Under the content management function 38, the theatre manager or another designated operator can load new digital content 46 to the central server 10, and view, edit and delete the digital content stored in the server database 12. Examples of content are rolling ads (commercials), trailers (feature film previews) and full features (feature films). Content generally comes, e.g., from a studio, an advertising provider or the like, and is intended to be exhibited for a contracted period of time. Thereafter, the content is purged. While not a part of this invention, the digital content 46 would typically be received over a satellite connection, a terrestrial network, or physical media such as a DVD that is delivered to the theater office.

Another key use of content is for the creation of playlists. A playlist is an ordered collection of one or more content files available from the content management server 10, and represents the content package that is scheduled into a particular auditorium at a particular time. In a totally digital environment, a playlist is analogous to the final reel of film that a projectionist prepares for exhibition, by splicing rolling ads and trailers to the main feature film. In a mixed digital and film environment, the playlist is analogous to the spliced film components comprising the rolling ads and perhaps the trailers that are scheduled to precede the main feature film, or simply run between main feature films as, e.g., a digitized slide show. Under the playlist management function 40, the theatre manager create can create, edit and delete playlists. Having content at their core, playlists also have a specific lifetime, after which they are purged. Accordingly, each playlist represents the digital entity that is subsequently projected, either through a projector in an auditorium 30, or on a display 16, e.g., in the theatre lobby.

Once the playlists are created, the theater manager or another designated person must schedule when and where the required playlists are played. This is done in the scheduling function 42. The schedules for playlists to be exhibited are also tied to the theatre management system 36, and specifically to the theater's ticketing system, which also provides show times to newspapers and other sources well in advance of the scheduled showings. In the cinema operating system according to the preferred embodiment, the function of scheduling is to program into the system the start time and the auditorium in which each playlist will play. When the scheduled time arrives, the cinema operating system controls the starting and playback of the content represented within the digital playlist. Finally, a monitoring function 44 provides the theatre manager and projectionist a means to view the current state of playlist playback. The monitor user interface is similar to the scheduling user interface set to the present time, in that the theatre manager can view the overall state of playback in the various auditoriums and on the various displays tied to the cinema operating system.

Figure 2:
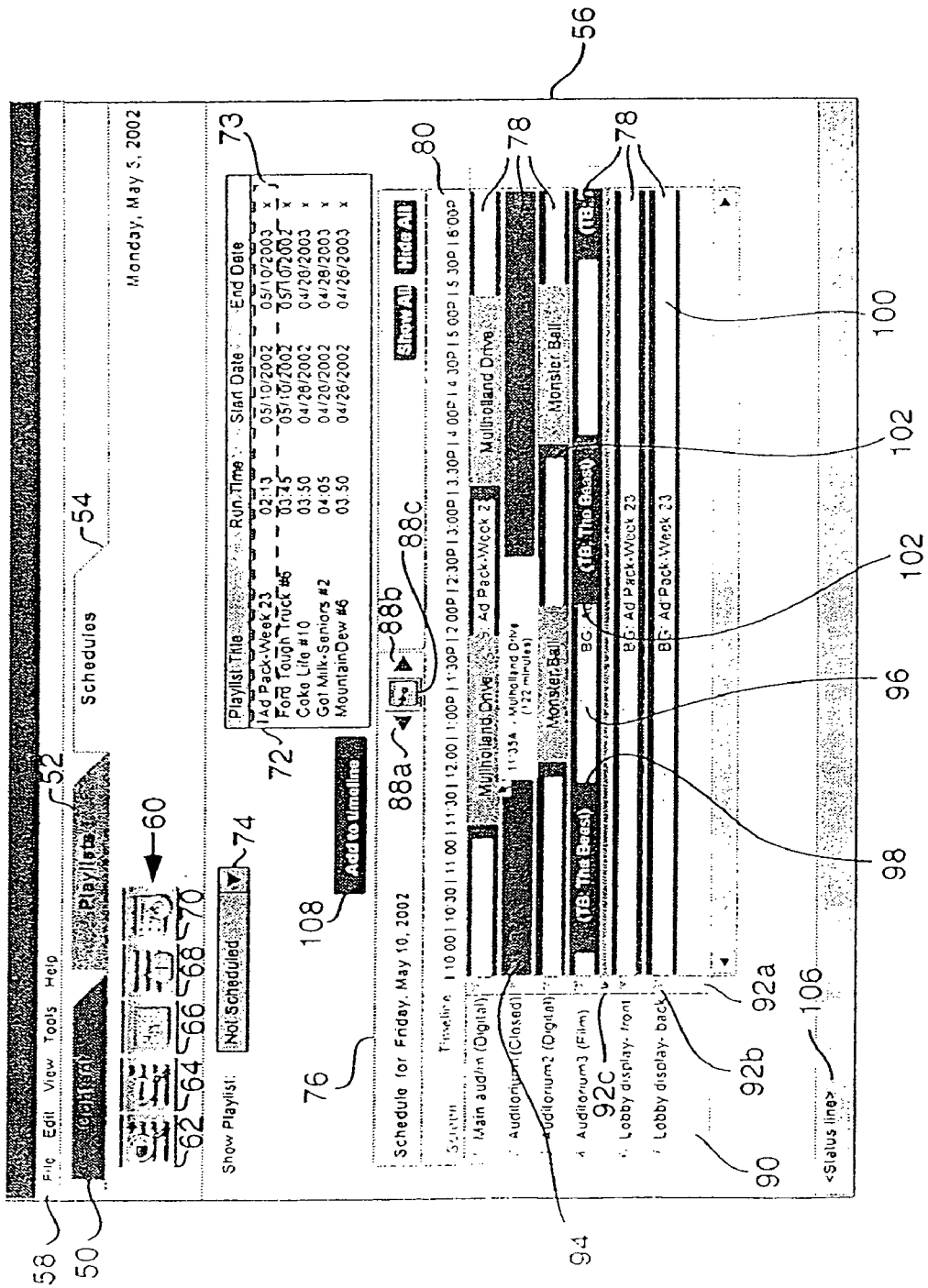
FIG. 2 is a pictorial illustration of a scheduling context screen from a graphical user interface implemented by the cinema operating system shown in FIG. 1.
Figure 3:
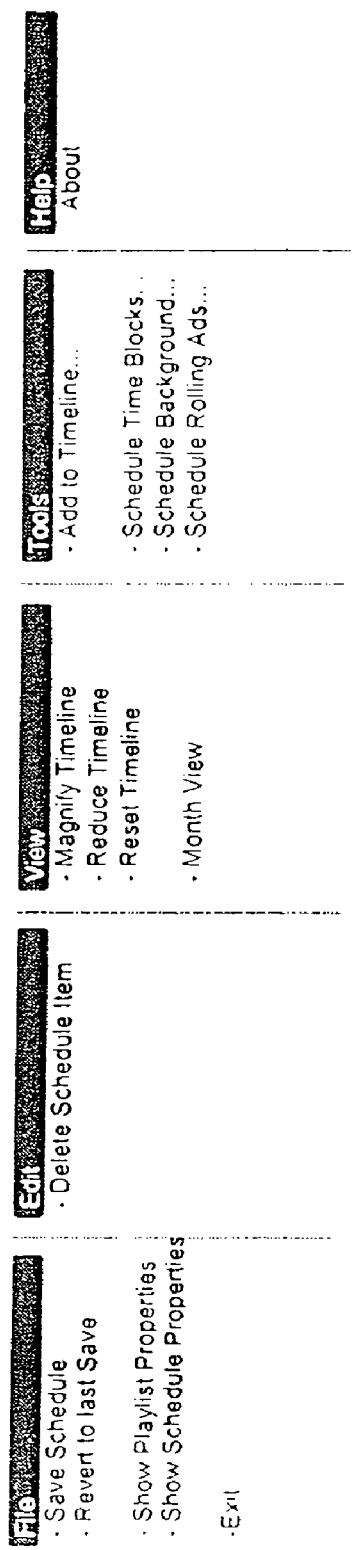
FIG. 3 is a pictorial illustration of the scheduling menus and controls accessible through the menu bar of the scheduling context screen shown in FIG. 2.

Referring to FIG. 2, the functional interface components (28) for content management 38, playlist management 40 and the scheduling function 42 are represented by respective tabs 50, 52 and 54. Clicking on the schedule tab 54 brings up a scheduling function context screen 56, which specifies the workflow and user interface of the scheduling function 42 according to the invention, and provides access to the menus, controls and commands for the scheduling function 42. A menu bar 58 provides access to certain menus and controls for the scheduling function 42, as further shown in FIG. 3, including alternative access to some of the controls and commands provided by the context screen 56.

The compact layout of the scheduling function context screen 56 provides a view of the 'free time' and schedules for all or some of the auditoriums 30 and displays 16 tied to the cinema operating system. The specifics of the scheduling function context screen 56 include a panel (toolbar) 60 of buttons, a table 72 of playlists currently in the content management server 10, a drop-menu 74 of predefined views that control what is displayed in the table 72, and a schedule table 76 that provides scheduling information and controls for each of the auditoriums 30 (and 30a) and displays 16 that exhibit digital content. The schedule table 76 shows, for each auditorium 30 (30a) and lobby display 16, an elongated timeline bar 78 arranged as shown in FIG. 2 one adjacent the other in relation to a time axis grid 80 to reveal the schedule for each auditorium 30 (30a) and lobby display 16, both individually and from the overall perspective of the whole cineplex theater. Furthermore, as will be noted in FIG. 2, certain auditoriums, i.e., auditoriums 1, 2 and 3, are digital auditoriums, while auditorium 4 is a film auditorium.

Figure 9:
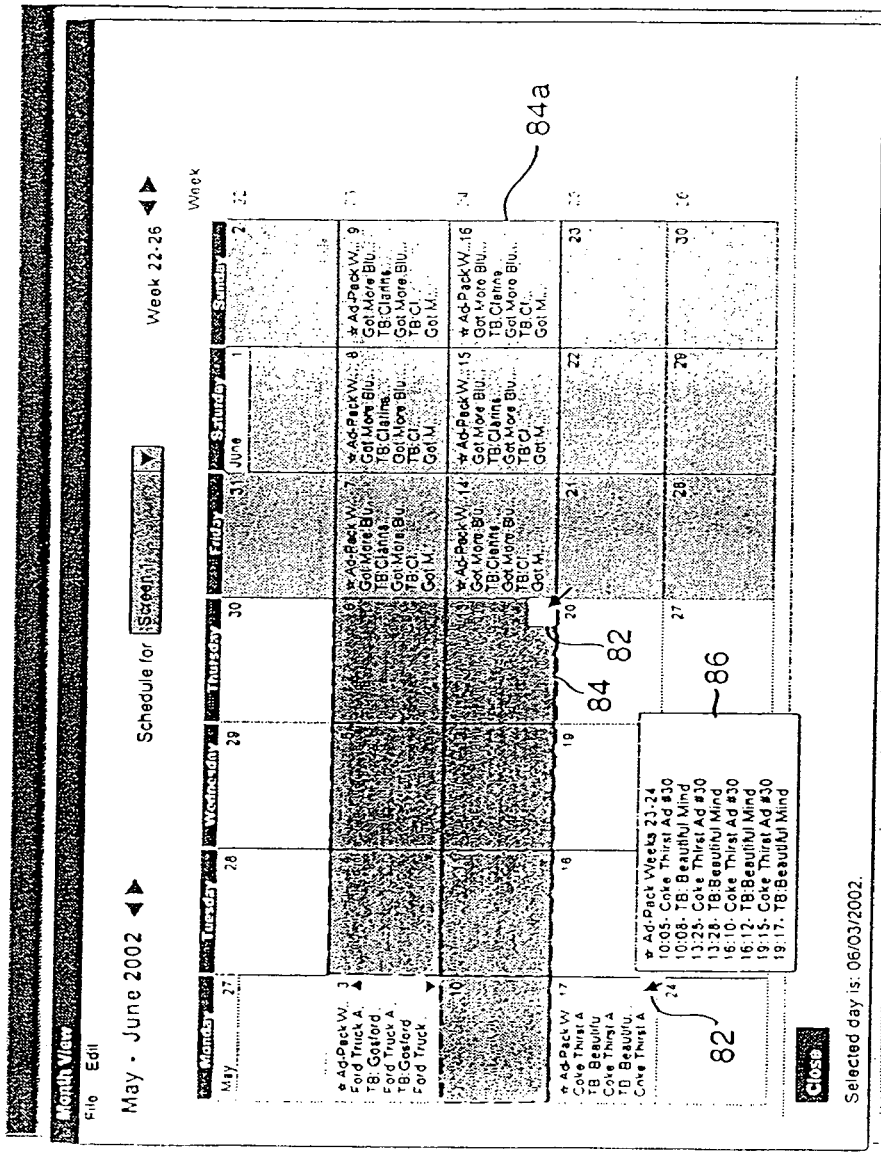
FIG. 9 is a pictorial illustration of a schedule view by month which is accessible through the scheduling context screen shown in FIG. 2 and the menu controls shown in FIG. 3.
Figure 10:
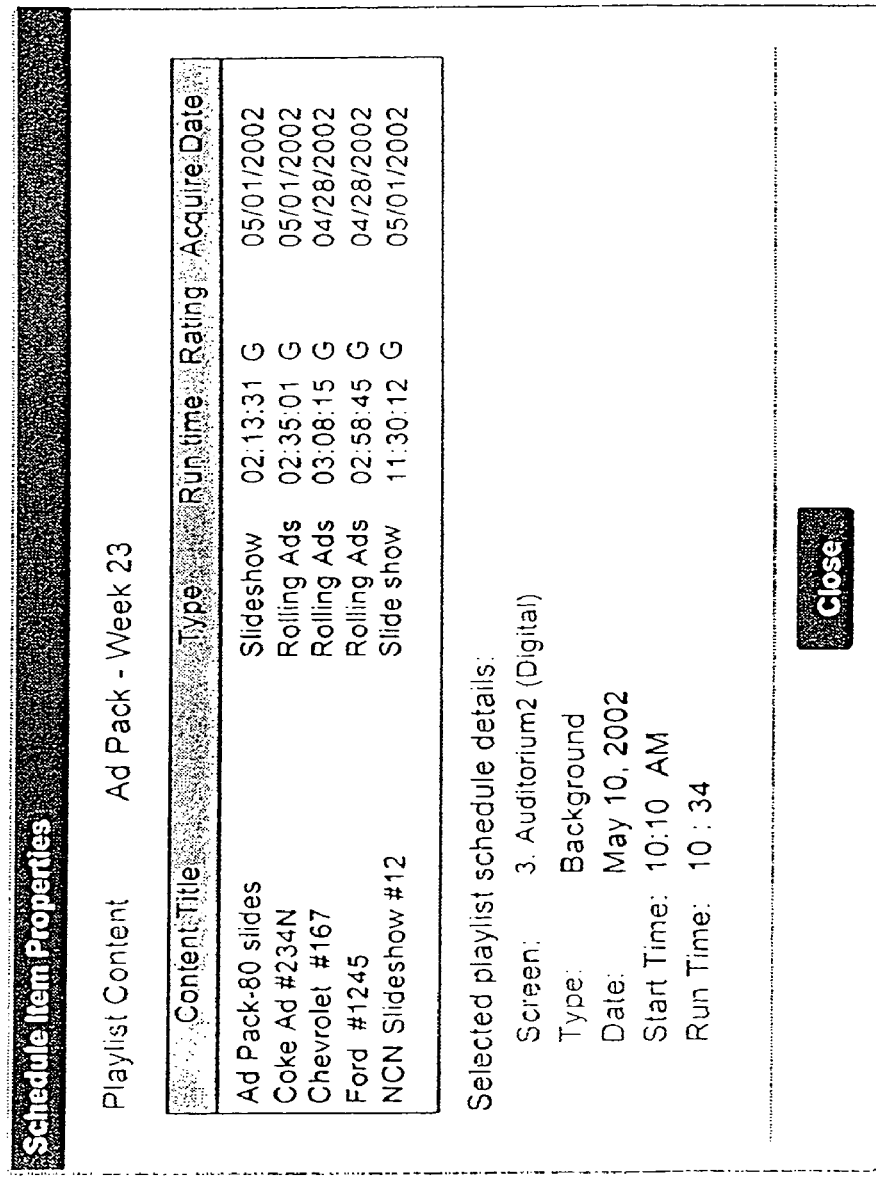
FIG. 10 is a pictorial illustration of a window showing schedule item properties for a particular playlist on a particular day for a particular screen, which is accessible through the scheduling context screen shown in FIG. 2 and the menu controls shown in FIG. 3.

The panel (toolbar) 60 of buttons, labeled with icons, identifies frequently used actions. As defined in the preferred embodiment, these buttons include: a magnify timeline button 62, a reduce timeline button 64, a month view button 66, a show playlist properties button 68 and a save schedules button 70. The theatre manager can use the magnify timeline button 62 and the reduce timeline button 64 to control the granularity of the schedule view, that is, by adjusting magnification settings the time axis grid 80 is adjusted such that the view in the schedule table 76 encompasses all or some smaller portion of the exhibition schedule for the day. The show playlist properties button 68 acts upon a currently selected playlist to show further properties of the selected playlist. The save schedules button 70 saves the results of the scheduling function into the server database 12. The month view button 66 presents the schedule view by month, as shown in FIG. 9. A feature of this view is that a schedule for a particular day in the month can be replicated for other days of the month by dragging the cursor 82 across the month until the desired days are highlighted, as shown by the shaded selection area 84, then clicking on, or otherwise designating, the area (e.g., by a copy and paste operation). When thus invoked, as shown in the example, the schedule for June 3 is replicated for June 4–6 and 10–13, and appears in the appropriate calendar blocks associated with these dates. The area 84a represents a portion of the month where this feature was previously invoked. FIG. 9 also shows that when the tool-tip of the cursor 82 is positioned over a particular day (June 17 in this example), a pop-up box 86 appears that reveals further information about the schedule, including the beginning time of each playlist within the schedule for the day.

Figure 4:
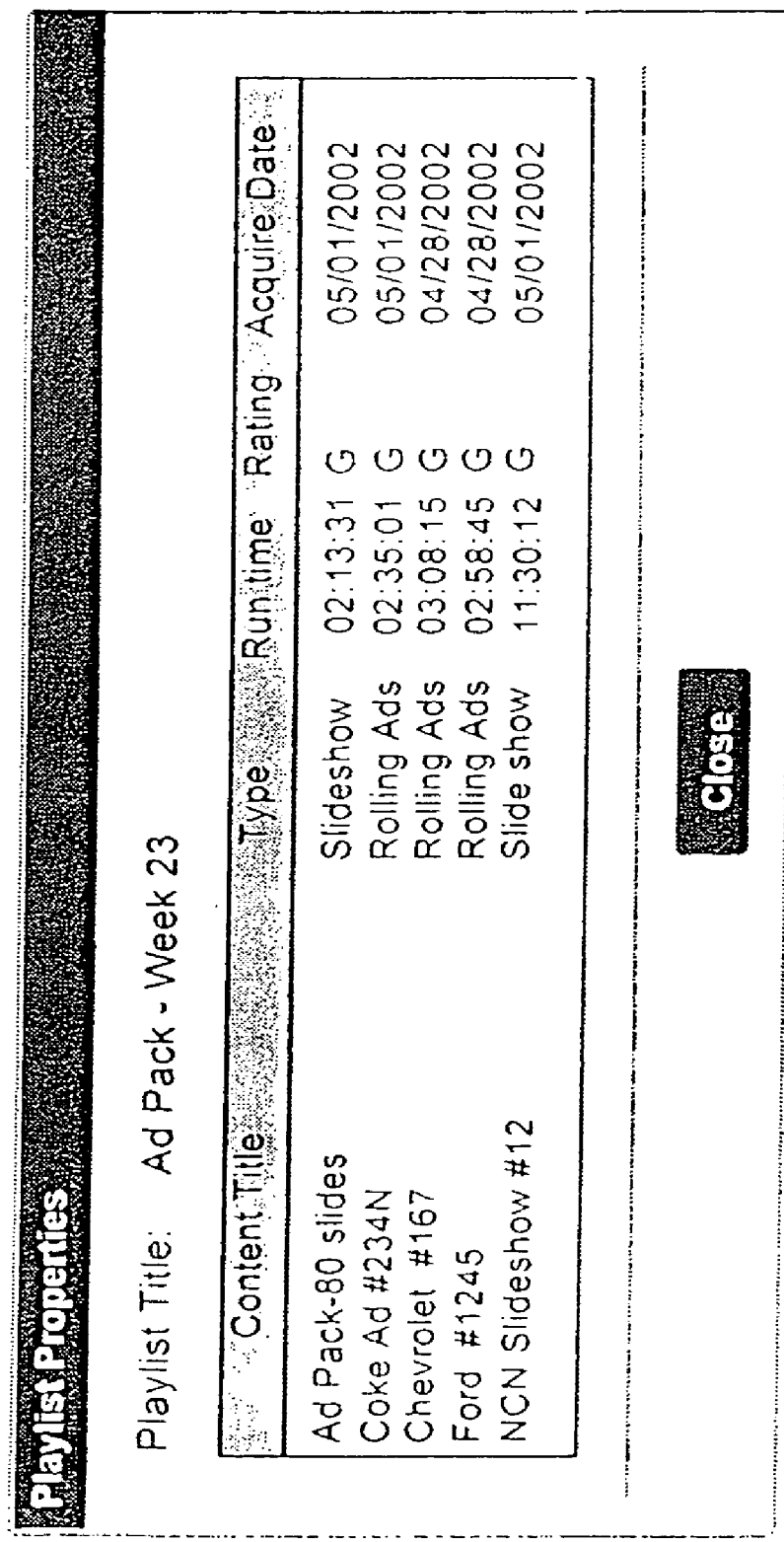
FIG. 4 is a pictorial illustration of a window showing playlist properties, which is accessible through the scheduling context screen shown in FIG. 2 and the menu controls shown in FIG. 3.

The drop-menu 74 of predefined views, which controls what is displayed in the playlist table 72, includes several core views of the playlists available from the content management server 10. These core views include, but are not limited to, showing: All (playlists), Not Scheduled (playlists), Scheduled (playlists), Playlists with Ads, Playlists with Slideshows, Playlists with Features, Playlists with Live Events, and so on. (A "slideshow" is a series of digital still images that are repetitively displayed before and/or after the feature presentation and its associated ads and trailers. A "live event" is a live feed of a currently happening event, such as a musical performance or a sporting event.) In the playlist table 72, key attributes of the listed playlists are shown, such as playlist title, run time, and the starting and ending dates for the playlist engagement; other information can be had by selecting a particular playlist (as depicted by the broken line selection box 73 around the first playlist "Ad Pack-Week 23") and applying the toolbar button 68 for showing playlist properties, which produces the playlist properties window shown in FIG. 4. As shown therein, the selected playlist title "Ad Pack-Week 23" is comprised of five pieces of digital content, each shown with their content title, type, run time, rating and acquire date.

The schedule table 76 provides scheduling information and controls for each of the auditoriums 30 (30a) and displays 16 that exhibit digital content. In the top left of the schedule table 76, the date is shown for which schedules are being viewed and managed. A set of three controls 88a, 88b and 88c are used to change the day/date of the schedule view. The left arrow 88a changes the view to the previous day; the right arrow 88b changes the view to the next day, and the middle control 88c brings up a pop up calendar control (not shown) for the user to select a specific day to view. In the left column 90 of the schedule table 76 are the names of the auditoriums (screens) 30 (30a) and displays 16 for which the theatre manager can develop a schedule. The names of the screens can be defined and changed by the theatre manager, thus providing for customization. By design, the screen names are also labeled by an index number, i.e., the numbers 1 to 7 as shown in FIG. 2. Each of the screen names can be selected; when one is selected, the month view button 66 can be invoked and the theatre manager can view five weeks of schedule information, set for the selected screen, as shown in FIG. 9. The vertical control bar 92a to the left of each screen's timeline 78 includes icons 92b and 92c for showing (icon 92b) or 'collapsing' or hiding (icon 92c) the corresponding screen (e.g., in FIG. 2, screen 5 is shown as hidden). By hiding one or more timelines 78 this way, the theatre manager can visually bring normally separated timelines 78 closer together, to accommodate special scheduling tasks. The controls 92*b* and 92*c* are reversible; when clicked again, after hiding a timeline, the timeline is re-presented and the schedule can be worked on.

The timeline for each of the screens is represented by the narrow timeline bar 78, representing from left to right, the theatre day, i.e., the hours on the time axis grid 80 during which content can be exhibited in the theatre. Before a schedule is generated, the timeline 78 is represented by an open space 94, as shown for auditorium 2 in FIG. 2 (which is closed). As a schedule is generated, there are two types of scheduling elements that may reside in the timeline bar: one is referred to as a "block" and the other as a "time block". The block, e.g., the block 96 in the auditorium 3, represents a period of time in which a playlist is scheduled to play, while the time block, e.g., the block 98 in auditorium 4, represents a period of time that the schedule timeline is busy with some other activity (typically a non-digital activity, such as film projection), during which a block should not be scheduled. (It should be understood that the use of a block is a matter of convenience and preferred usage and presentation; other elongated timeline elements, such as a line, could be used instead.) The timeline is also separated into a background and a foreground. The background represents any time in the timeline that is available for scheduling; the foreground represents a period of time within which a playlist is scheduled to override the background.

Figure 11:
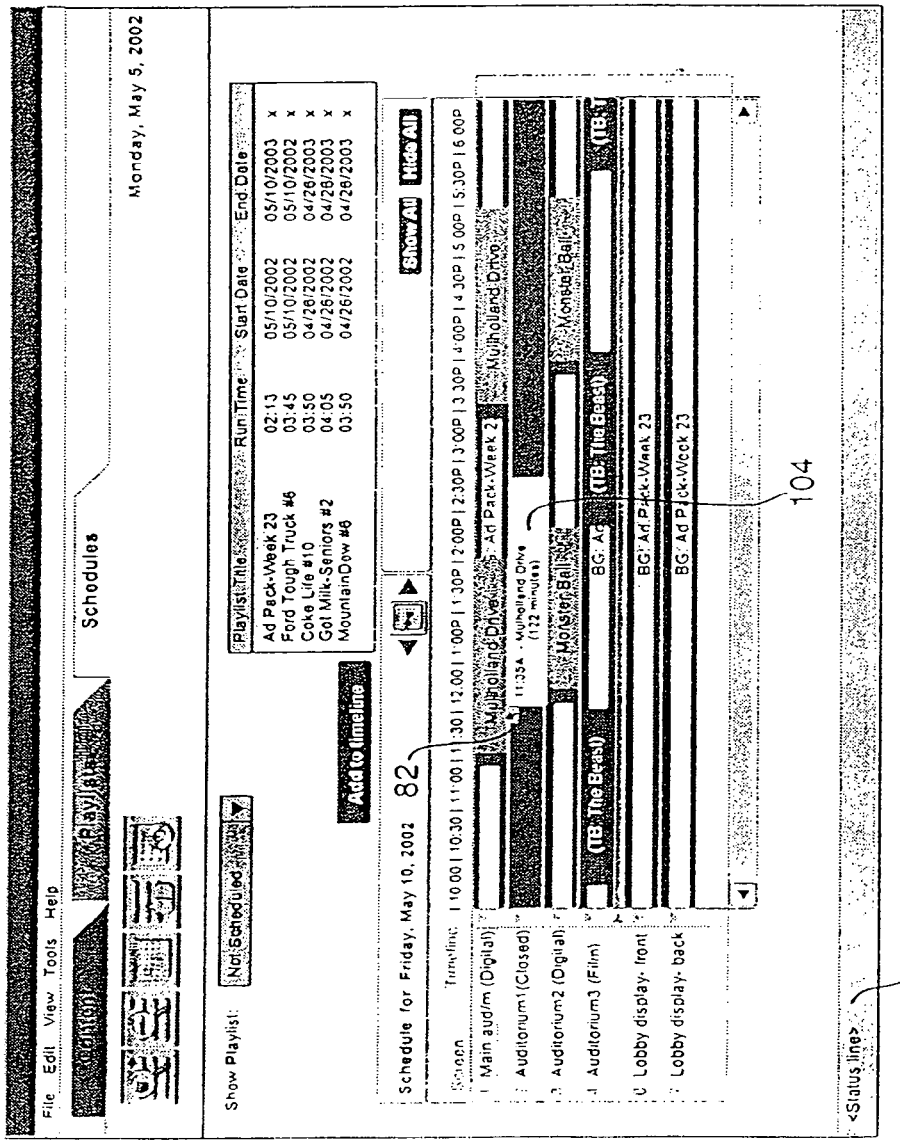
FIG. 11 is a pictorial illustration of the scheduling context screen shown in FIG. 2, which is filled out to show the schedule properties on a particular day for the theater.

The representation of blocks varies, according to the way a playlist is scheduled: a block 100 represents a background-scheduled playlist as a "block" stretched across the entire timeline. A playlist scheduled in the background can play repeatedly. A block 102 represents a playlist scheduled as a rolling ad. A rolling ad playlist has the property of being attached to a feature playlist of a time block. The consequence of this property is that if the feature playlist or time block is rescheduled, the rolling ad is automatically rescheduled, so that it stands to play before the feature playlist or time block. As mentioned before, the block 98 represents a time block, which is a period of time that the schedule timeline is busy. An example of its use is to block off time that the digital projector does not project content, allowing instead, the projection of film-based content. As shown in FIG. 11, scheduled playlists and time blocks are labeled for easy identification, directly in the block, and in a tooltip tag 104 when the cursor 82 hovers over the block. At the bottom of the screen is a status message line 106. It is used to feedback results of user actions, such as the rescheduling of a playlist, the addition of a new playlist, and so forth.

The user interface shown in FIG. 2 is used for several different types of scheduling, including foreground scheduling, background scheduling, time block scheduling, and rolling ad scheduling. Each type of scheduling will now be discussed in more detail, further including the related matters of scheduling by film booking number and adjusting the schedules.

Figure 5:
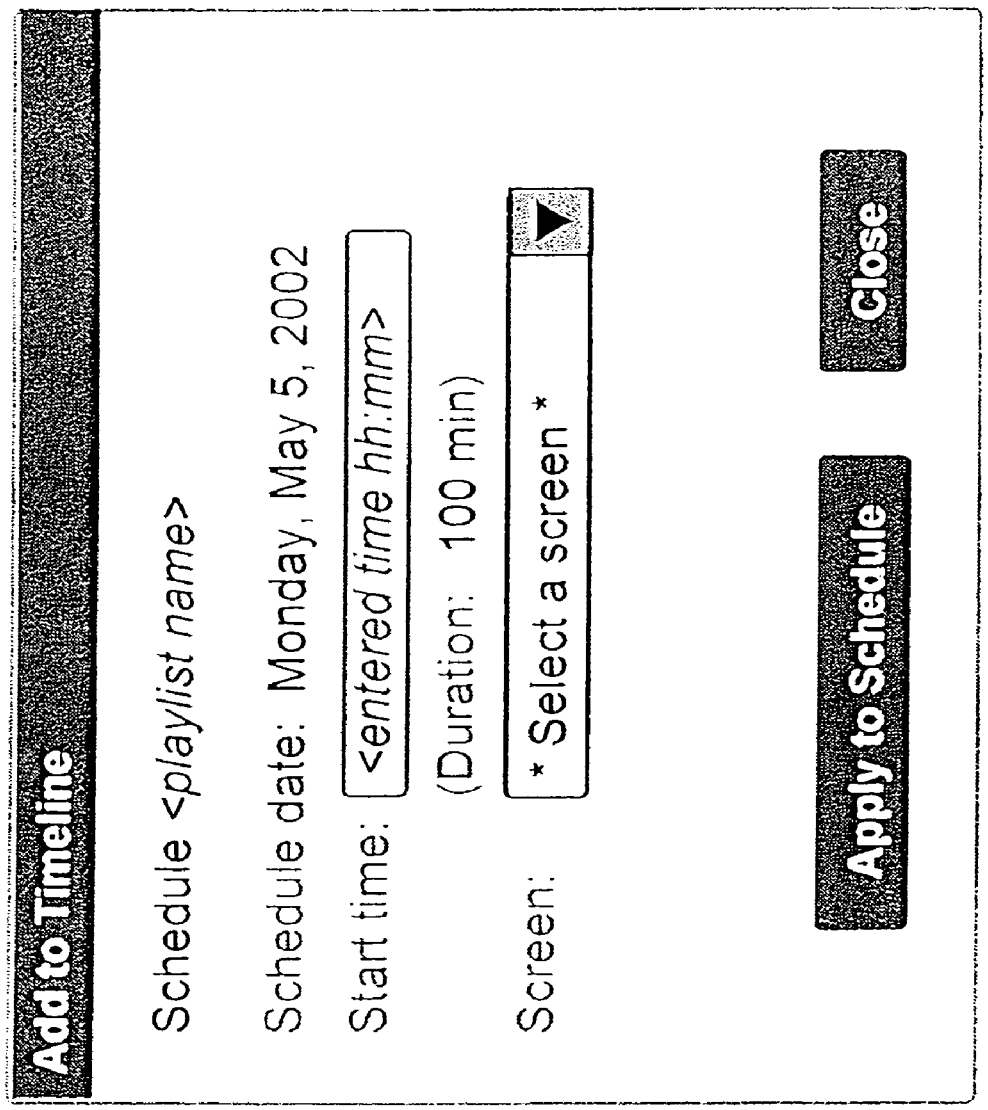
FIG. 5 is a pictorial illustration of a dialog box for scheduling a playlist in the foreground of a schedule timeline shown in the scheduling context screen shown in FIG. 2, which is accessible through the scheduling context screen shown in FIG. 2 and the menu controls shown in FIG. 3.

Foreground scheduling. To schedule a playlist in the foreground, the theatre manager selects an appropriate playlist from the playlist table 72, and selects either 'Add to Timeline' from the tools menu (FIG. 2), or clicks the add to timeline control button 108. This initial action opens a dialog box for the theatre manager to enter specific scheduling information, as shown in FIG. 5. After entering valid scheduling information, the schedule table 76 is updated, showing the newly scheduled playlist as a timeline block 96, on the specified screen's timeline.

Figure 7:
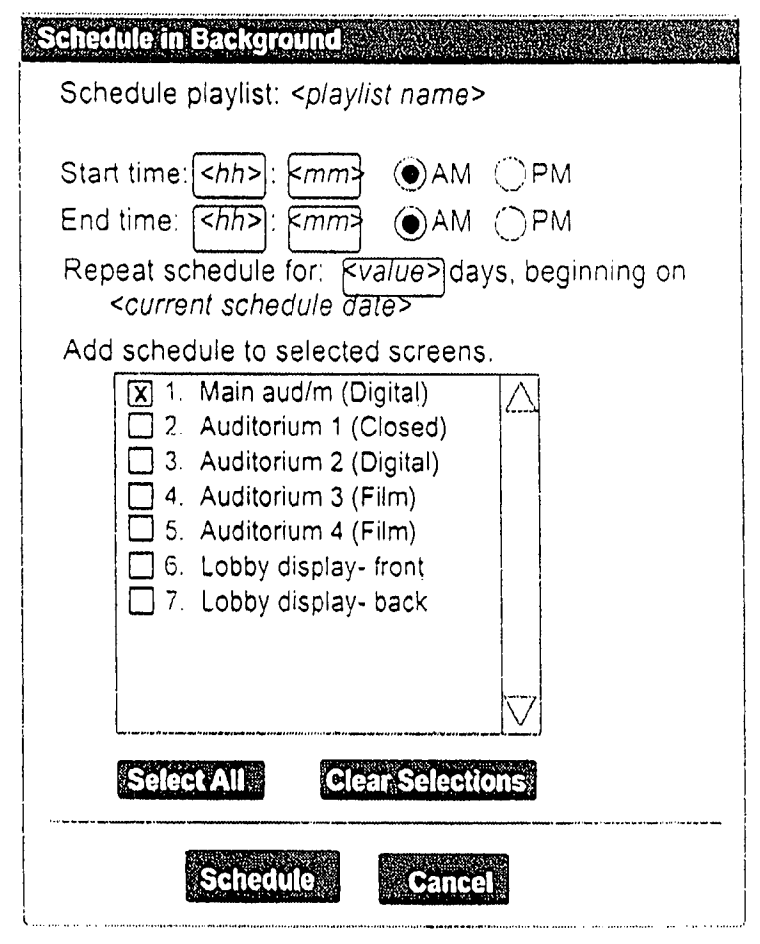

Background scheduling. To schedule a playlist in the background, the theatre manager selects an appropriate playlist from the playlist table 72 and selects 'Schedule in Background' from the tools menu (FIG. 2). This action opens a dialog box for the theatre manager to enter specific scheduling information, as shown in FIG. 7. After entering valid scheduling information, the schedule table 76 is updated. If only one screen is specified in the scheduling dialog, then a new background block 100 appears in the timeline of that screen. If more than one screen is specified in the scheduling dialog, then replicas of the background block 100 appear in timelines of the associated screens.

Time Block scheduling: Scheduling a time block basically establishes in the cinema operating system that at the scheduled time and for the specified duration, the specified digital projector 14 tied to a particular screen, or the specified digital monitor 16 will not play back content. One purpose for this functionality is to schedule a time block 98 that the digital projector/system will 'stand by', while, in parallel, a film content is played/projected. Tied to this use of time blocks, is the capability of switching between digital projection and film projection. This capability is based on "event tags", that are purposefully integrated in playlists, in or between content items in the playlist. An example of an "event tag" is an automation cue integrated into a playlist to enable an audio format switch to occur between digital ad content and feature film content, such as from a lesser featured sound presentation to a surround sound Dolby™ presentation.

To schedule a time block 98, the theatre manager selects 'Schedule Time Block' from the tools menu (FIG. 2). This action opens a dialog box for the theatre manager to enter specific information, as shown in FIG. 6. The dialog is designed such that the theatre manager can enter a series of time blocks to the schedule, for a given day, without closing and reopening the dialog box. After clicking "Apply" in the dialog box, the schedule table 76 is updated, showing the newly scheduled time block 98 on the specified screens' timeline.

Rolling Ad Scheduling: Rolling ads as content can be embedded at the start of a feature (movie) playlist, and thus, be scheduled in a typical foreground process. In theatres that exhibit digital ads in combination with features on film, rolling ads are scheduled as stand alone playlists. The basic goal of scheduling a stand-alone rolling ad is to ensure that it plays immediately before the start of a scheduled feature playlist or time block. The cinema operating system provides a means of automatically ensuring this type of scheduling. The theatre manager selects an appropriate rolling ad playlist from the playlist table 72 and selects 'Schedule Rolling Ad' from the tools menu (FIG. 2). This action opens a dialog box for the theatre manager to enter specific scheduling information, as shown in FIG. 8. Note that the current schedule date (or in some cases, start time) input in the dialog box is the earliest date (time) that the selected rolling ad is to be scheduled. After entering valid scheduling information, the schedule table 76 is updated.

The scheduled rolling ad is automatically replicated and placed as a block 102 immediately before every feature-containing block and/or time block in the specified timelines. Being essentially attached to a time block or feature playlist, a rolling ad is automatically rescheduled if its corresponding time block or feature playlist schedule is adjusted. Besides rolling ads, any particular playlist, e.g., a background playlist, can be associated with a feature (movie) playlist or attached to a time block, and automatically rescheduled if its corresponding time block or feature playlist schedule is adjusted.

Scheduling by a Unique Film Identification Number: A variation on the process of scheduling a rolling ad is to schedule by a unique film identification number, e.g., a number similar to a film booking number (FBN). A film booking number is a unique number, assigned at the time the content is created in the theatre. This method of scheduling allows rolling ad exhibition to be targeted with particular features. To schedule by a unique film identification number, the theatre manager selects an appropriate rolling ad playlist from the playlist table 72, and selects 'Schedule Rolling Ad' from the tools menu (FIG. 2).

Adjusting Schedules: The cinema operating system provides various ways to adjust the schedules of items. In general, blocks on a timeline can be individually selected and managed. The basic way to reschedule an item is to re-open the scheduling dialog box of a selected scheduled playlist, and enter new parameters. Re-opening the scheduling dialog box is by double-clicking the scheduled playlist. Other ways of adjusting are sliding, stretching and dragging.

Figure 12:
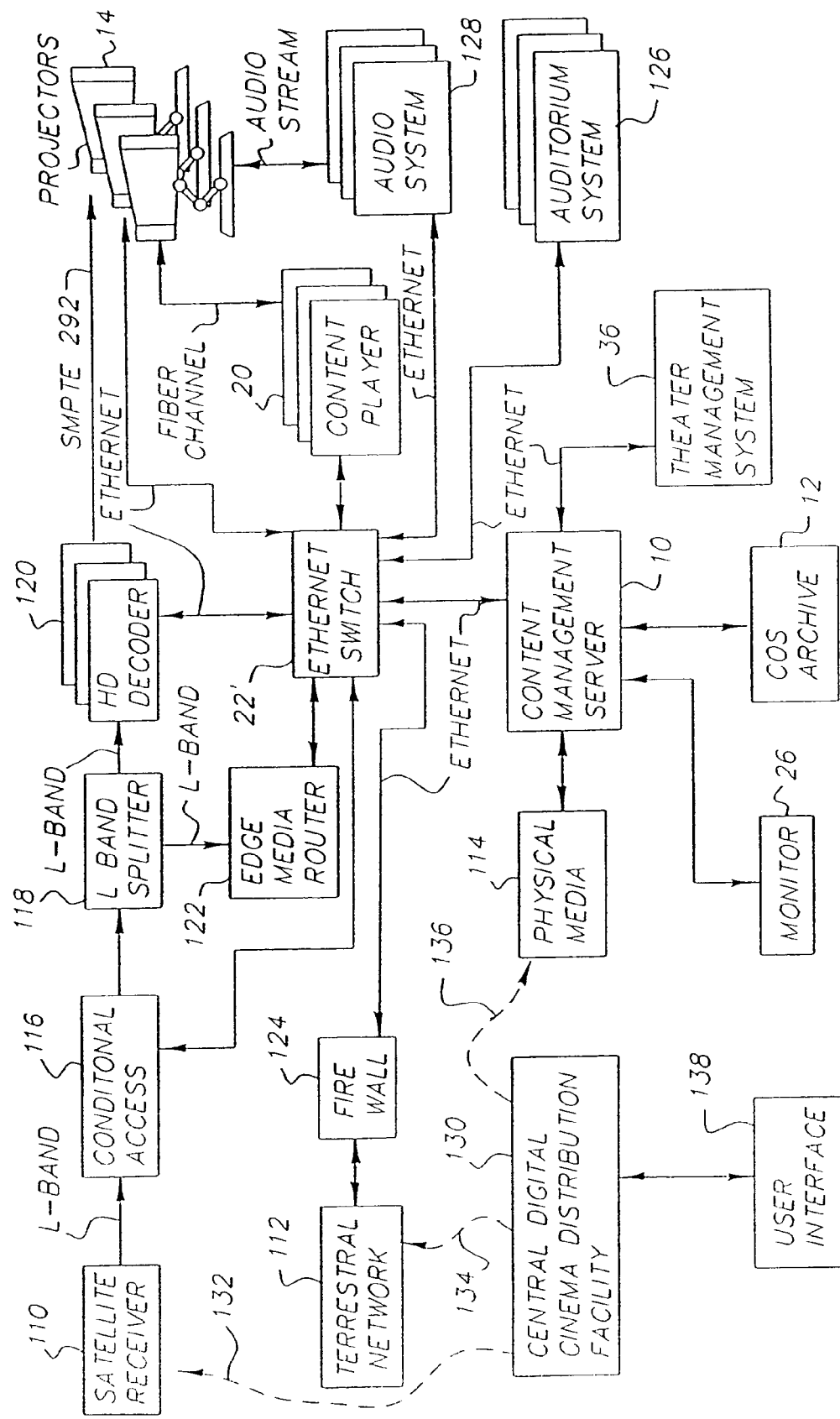
FIG. 12 is a block diagram of an exhibition component of a digital cinema system, showing in particular a further embodiment of a cinema operating system in accordance with a further aspect of the invention.

FIG. 12 shows an alternative embodiment of the digital cinema system, where components similar to those shown in FIG. 1 have similar reference characters and descriptions, and generally will not be further described here. One exception is the LAN 22, which is embodied here as a network switch 22' specifically (but without limitation) for an Ethernet LAN application. In FIG. 12, the digital content would typically be received from several digital sources, including from a satellite receiver 110, over a terrestrial network 112, or as physical media 114 such as a DVD that is delivered to the theater office. As shown, the satellite network may handle both prerecorded digital content (including ads, trailers, slide shows, features (movies) and the like) received from any of the above sources, and live digital content from, e.g., live musical performances, live sporting events, and the like, that is received from the satellite receiver 110.

Live digital content from the satellite receiver 110, which may be in MPEG or any other suitable well-known data format, is split by an L band splitter 118 and decompressed by one or more high definition (HD) decoders 120 and transmitted to the projectors 14 in accordance with the Society for Motion Picture and Television Engineers (SMPTE) 292 protocol, which is a well-known high definition standard for digital transmission. Note also that live event data can be streamed from the HD decoders 120 through the LAN network switch 22', from which it may be alternatively fed through the LAN to any of the projectors 14. For satellite reception of live performances, the live digital content is routed through a conditional access stage 116. The transmission protocols for the live performances may prescribe an encrypted link that is decrypted in the conditional access stage 116 by a key provided over the LAN through the network switch 22' from the local cinema operating system.

In the case of satellite reception of prerecorded digital content, the digital content is routed through (or bypasses) the conditional access stage 116 (which does not perform any data decryption) and the L band splitter 118 to an edge media router 122, which stores and forwards the digital content to the content management server 10 and the archive 12 through the network switch 22'. Digital content from the terrestrial network 112 is routed through a firewall 124 into the network switch 22'. In addition, the Ethernet LAN connects with an auditorium system 126, which controls the lighting and other such functions in the theater, and optionally to an audio system 128, which provides the audio feed for the auditoriums. As mentioned earlier, one of the things that is different here from FIG. 1 is that the decoding processor identified as component 18 in FIG. 1 is here embedded into the projectors 14, where the decoder processing performs both decompression and decryption of the prerecorded digital content data. If the decoder processor (18) is embedded into the projectors 14, then the projectors 14 become network devices capable of being driven directly off the Ethernet LAN 22. Having the projectors 14 as network devices has an added redundancy benefit since any given projector can be driven off any content server 20, therefore providing automatic backup in case the content server for a particular auditorium should go down.

FIG. 12 also shows that a central digital cinema distribution facility or service 130 can provide content through a satellite link 132 to the satellite receiver 110, through a terrestrial link 134 (e.g., the Internet) to the terrestrial network 112, or through a transportation link 136 (e.g., UPS, FedEx, Postal Service, etc.) as physical media 114. In a further aspect of the invention, some or all of the functional interface components 28 (see FIG. 1) may be provided according to the invention by the central digital cinema distribution facility 130 through its own graphical user interface 138. In particular, playlists may be assembled at the central digital cinema distribution facility 130, where the associations between the playlists and the features and films necessary to create a scheduling item may be established. More specifically, under the playlist management function 40, the facility can create, edit and delete specific playlists, especially playlists of the type (such as rolling ads) that are embedded at the start of a feature (movie) playlist and which will later be scheduled at the cineplex in a typical foreground process for a specific screen. For a film, such playlists could be scheduled as stand alone playlists associated with a specific film by a unique film identification number (e.g., in certain cases, the aforementioned FBN).

Besides alleviating the need for local cineplex scheduling of certain content, e.g., rolling ads, the basic goal of such scheduling at the central digital cinema distribution facility 130 is to tie a specific playlist to a specific feature playlist or time block during which a feature film is projected, therefore ensuring that the playlist runs immediately before the start of a subsequently scheduled feature playlist or time block. This can be significant because the distributor may want to ensure that a specific playlist (with, e.g., specific ad content) should be tied to films/features having a specific rating, genre, or the like. Furthermore, advertising may be rationed to a certain number of screens (e.g., some ads to odd screens/other ads to even screens, in a cineplex) depending on the advertising schedule received by the distributor, e.g., based on sliding scales of advertising charges/revenues proportioned to the number of screens or the number of "eyes" viewing the content. In these situations, scheduling items established by the distributor may be carried as meta-data that is associated with the digital content to the exhibition location, where scheduling for specific screens will occur. For instance, the meta-data may be embedded into, or otherwise carried with, the digital content signal over any of the several aforementioned communication links, or the meta-data could be linked to specific feature/film content by a unique identification number and transmitted separately, e.g., over the Internet, through the terrestrial link 134 to the LAN 22.

The invention has been described with reference to a preferred embodiment. However, it will be appreciated that variations and modifications can be effected by a person of ordinary skill in the art without departing from the scope of the invention.

PARTS LIST 10 content management server
12 server database
14 digital projector
16 display screen
18 decoding processor
20 content player server
22 local area network (LAN)
22' network switch
24 graphical user interface
26 high resolution display
28 functional interface components
30 auditorium
30a film auditorium
32 film projector
34 screen
36 theater management system
38 content management function
40 playlist management function
42 scheduling function
44 exhibition/playback monitoring function
46 digital content
50 content management tab
52 playlists management tab
54 schedules function tab
56 scheduling function context screen
58 menu bar
60 panel (toolbar) of buttons
62 magnify timeline button
64 reduce timeline button
66 month view button
68 show playlist properties button
70 save schedules button
72 playlist table
74 drop-menu
76 schedule table
78 elongated timeline bar
80 time grid
82 cursor
84 shaded selection area
84a selected area
86 pop-up box
88a left arrow
88b right arrow
88c middle control
90 left column
92a vertical control bar
92b show icon
92c hide icon
94 open space
96 block
98 time block
100 background scheduled playlist block
102 rolling ad scheduled playlist block
104 tooltip tag
106 status message line
108 add to timeline button
110 satellite receiver
112 terrestrial network
114 physical media
116 conditional access stage
118 L band splitter
120 high definition decoders
122 edge media router
124 firewall
126 auditorium
128 audio system
130 central digital cinema distribution facility or service
132 satellite link
134 terrestrial link
136 transportation link
138 distribution facility user interface

What is claimed is:

1. A digital cinema system for exhibiting digital content supplied in a coded form to a central content management server in a multi-screen digital cinema theatre having a plurality of auditoriums, said system comprising:
(a) plurality of digital projectors for projecting digital content in the plurality of auditoriums, each projector including a decoder for decoding the digital content into a device-dependent signal for projection; wherein at least one of the plurality of auditoriums includes a film projection system for projecting a motion picture film during a reserved time when the auditorium's digital projector is inactive, and wherein the cinema operating system generates a playlist for scheduling digital projection of digital content in association with the motion picture film,
(b) a plurality of content player servers, each one devoted to a respective digital projector;
(c) a cinema operating system for generating and scheduling playlists, each said playlist including components of the content stored in the content management server and representing a digital entity that is subsequently projected in the digital cinema;
(d) a local area network linking the content player servers to the central content management server and to the digital projectors, whereby each digital projector is a network-enabled device that can communicate with any of the content player servers to display digital content associated with a selected playlist; and
(e) an event tag for switching between digital projection and film projection corresponding to a predetermined condition or cue.

2. The digital cinema system claimed in claim 1, wherein in step (e), switching between digital projection and film projection includes a cueing means for controlling the digital projector corresponding to a signal from the film projector.

3. The digital cinema system claimed in claim 1, wherein a user interface includes a means for controlling the film projector.

4. The digital cinema system claimed in claim 3, wherein the user interface includes a status message line that indicates operational scheduling of both film and digital projection systems.

5. A computer program product comprising a graphical user interface for scheduling a playlist from digital content supplied to a server in a multi-screen digital cinema theater, said playlist including components of the content stored in the server and representing a digital entity that is subsequently projected in the digital cinema theater, said computer program product comprising: a computer readable storage medium having a computer program stored thereon for performing the steps of:
(a) generating and displaying a table of playlists currently available for scheduling, each playlist displayed along with its run time;
(b) generating and displaying a schedule table showing a schedule view for each screen as an elongated timeline bar representing a time dimension, wherein the elongated timeline bars for a plurality of the screens are arranged one adjacent the other relative to a displayed time axis to provide an overall perspective of the schedules for the screens of the theater;

(c) enabling selection of a playlist from the table of playlists and specification of a scheduled start time and a selected screen;

(d) updating the schedule table by inserting the selected playlist as an elongated element into the elongated timeline bar for the selected screen, wherein the element starts at the scheduled start time and has a time dimension corresponding to the run time of the selected playlist, whereby the updated schedule table is used to schedule the selected playlist for the selected screen; and (e) switching between projection of digital content and projection of feature content subject to a predetermined condition or cue.

6. A method for generating and scheduling a playlist from digital content supplied to a server in a multi-screen cinema theater including one or more film projection sites, said playlist including components of the content stored in the server and representing a digital entity that is subsequently projected in the projection sites, said method comprising the steps of:

(a) generating playlists including digital content for use in the film projection sites;

(b) generating and displaying a schedule table showing a schedule for each projection site as an elongated timeline bar representing a time dimension, wherein the elongated timeline bar for each film projection site includes a reserved time for the projection of the film;

(c) selecting a playlist and specifying a selected film projection site;

(d) updating the schedule table by inserting the selected playlist as an elongated block into the elongated timeline bar for the selected projection site, wherein the block for the playlist starts is automatically situated at the beginning of the reserved time for projection of the film; and (e) switching between projection of digital content and film projection subject to a predetermined condition or cue.

7. A computer program product comprising a graphical user interface for generating and scheduling a playlist from digital content supplied to a server in a multi-screen cinema theater including one or more film projection sites, said playlist including components of the content stored in the server and representing a digital entity that is subsequently projected in the projection sites, said computer program product comprising: a computer readable storage medium having a computer program stored thereon for performing the steps of:

(a) generating playlists including digital content for use in the film projection sites;

(b) generating and displaying a schedule table showing a schedule for each projection site as an elongated timeline bar representing a time dimension, wherein the elongated timeline bar for each film projection site includes a reserved time for the projection of the film;

(c) selecting a playlist and specifying a selected film projection site;

(d) updating the schedule table by inserting the selected playlist as an elongated block into the elongated timeline bar for the selected projection site, wherein the block for the playlist starts is automatically situated at the beginning of the reserved time for projection of the film; and (e) switching between digital projection and film projection subject to a predetermined condition or cue.

* * * * *